United States Patent Office 3,812,164
Patented May 21, 1974

3,812,164
SILICONE ELASTOMERS WITH PAINTABLE
SURFACE
Jay R. Schulz, Bangor Township, Bay County, Mich., assignor to Dow Corning Corporation, Midland, Mich.
No Drawing. Filed Feb. 16, 1973, Ser. No. 333,425
Int. Cl. C08g 51/04
U.S. Cl. 260—375 B    14 Claims

ABSTRACT OF THE DISCLOSURE

Mixing a hydroxyl endblocked polydimethylsiloxane, a filler, an alkoxy silicon compound, such as, n-propylorthosilicate,

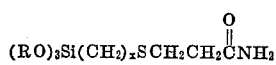

and a metal carboxylate provides a room temperature vulcanizable silicone elastomer composition which cures to provide an elastomer whose surface can be painted with either a latex base paint or an oil base paint.

---

This invention relates to a method of making a room temperature vulcanizable silicone elastomer composition which cures to provide a paintable surface.

Silicone elastomers are, in general, not paintable. It is advantageous to provide a silicone elastomer with a paintable surface, preferably a surface that may be painted with either a latex base paint or an oil base paint. The need for a paintable silicone elastomer is apparent when an article to be painted contains exposed silicone elastomer surface. If the paint will not adhere to the silicone elastomer surface, the aesthetics are impaired.

Therefore, the object of this invention is to provide a room temperature vulcanizable silicone elastomer composition which has a paintable surface when cured. This object and others will become apparent from the following detailed description.

This invention relates to a method for making a room temperature vulcanizable silicone elastomer composition consisting essentially of mixing (A) 100 parts by weight of a hydroxyl endblocked polydimethylsiloxane having a viscosity of from 1000 to 100,000 cs. at 25° C., (B) from 5 to 200 parts by weight of a filler, (C) from 0 to 14.5 parts by weight of an alkoxy silicone compound selected from the group consisting of ethylorthosilicate, n-propylorthosilicate, ethylpolysilicate and n-propylpolysilicate, (D) from 0.5 to 10 parts by weight of a silane of the formula

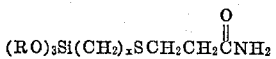

wherein R is methyl, ethyl or propyl and x is 1, 2, 3 or 4, the combination of (C) and (D) providing from 1 to 15 parts by weight per 100 parts by weight of (A), (E) from 0.1 to 5 parts by weight of a metal salt of a carboxylic acid wherein said metal ranges from lead to manganese inclusive in the electromotive series of metals and said carboxylic acid has less than 16 carbon atoms.

The hydroxyl endblocked polydimethylsiloxane of (A) has a viscosity of from 1000 to 100,000 cs. at 25° C., preferably from 1000 to 50,000 cs. at 25° C. These hydroxyl endblocked polydimethylsiloxanes can contain, for the purpose of this invention, small amounts of other organic radicals besides methyl radicals such as ethyl, phenyl, vinyl or 3,3,3-trifluoropropyl. These hydroxyl endblocked polydimethylsiloxanes are well known and can be purchased commercially.

The filler of (B) can be any of the fillers conventionally used in silicone elastomers such as the reinforcing fillers and non-reinforcing fillers. The reinforcing fillers include both the treated and untreated silica fillers such as fume silica. The treated reinforcing silica fillers are well known and can be treated with silanes, silanols, siloxanes both linear and cyclics and silazanes. Other fillers include, titanium dioxide, calcium carbonate, diatomaceous earth, crushed quartz, asbestos, zinc oxide, zirconium silicate and carbon black. The filler can be any one filler or mixtures of two or more.

The alkoxy silicon compound (C) can be ethylorthosilicate, n-propylorthosilicate, ethylpolysilicate and n-propylpolysilicate.

The silane (D) has a formula

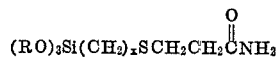

wherein R is methyl, ethyl or propyl and x is 1, 2, 3 or 4. These silanes can readily be prepared by reacting acrylamide with a mercaptosilane of the formula

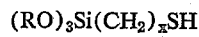

in the presence of benzyltrimethylammonium hydroxide.

The metal salts of carboxylic acids of (E) include those having metals ranging from lead to manganese inclusive in the electromotive series of metals and the carboxylic acids have less than 16 carbon atoms. The metals include lead, tin, nickel, cobalt, iron, cadmium, chromium, zinc and manganese. Examples of the metal carboxylates are dibutyltin diacetate, dibutyltin dilaurate, lead naphthenate, cobalt naphthenate, zinc naphthenate, iron 2-ethylhexoate, lead 2-ethylhexoate, lead 2-ethylhexoate, chromium octoate, dibutyltin dibenzoate, dibutyltin adipate, lead sebacate, dibutyltin dilactate, stannous octoate, dibutyltin di-2-ethylhexoate, and manganese 2-ethylhexoate. The preferred metal carboxylates are the tin salts.

The described ingredients are mixed to provide a room temperature vulcanizable silicone elastomer composition. These compositions cure at room temperature to an elastomer after mixing but have adequate working times for convenient use. Because these compositions cure after mixing, it is preferable for storage to divide the reactive ingredients into at least two packages, so that no one package contains a mixture of the hydroxyl polymer, alkoxy compounds and metal carboxylate. However, the cure rate of the complete mixture can be reduced by lowering the storage temperature and essentially stopped by freezing the mixture.

The amounts of the ingredients to be mixed and based on 100 parts by weight of hydroxyl endblocked polydimethylsiloxane are 5 to 200 parts by weight filler, 0 to 14.5 parts by weight alkoxy silicon compound, 0.5 to 10 parts by weight amide silane and 0.1 to 5 parts by weight metal carboxylate. The combination of alkoxy silicon compound and amide silane is from 1 to 15 parts by weight. The preferred compositions contain 10 to 60 parts by weight of filler.

Compositions which contain both alkoxy silicon compounds and amide silane preferably contain from 2 to 5 parts by weight of alkoxy silicon compound and from 0.5 to 4 parts by weight of amide silane.

Compositions which contain no alkoxy silicon compound (C) preferably contain from 3 to 10 parts by weight amide silane.

The compositions can also contain plasticizers which can be low molecular weight hydroxylated polydiorganosiloxane fluids, thixotroping agents, pigments and dyes. These and other conventional additives for silicone elastomers can be used, as long as, the paintability of the elastomer is not impaired. It is recommended that additives be tried on an experimental basis before large batches of composition are prepared to determine if paintability is affected.

The cured products of these compositions are elastomers which have paintable surfaces with both latex base paints and oil base paints. In addition to paintable surfaces, the elastomers have improved heat stability and improved adhesion to substrates.

The following examples are presented for illustrative purposes only and should not be construed as limiting the invention which is properly delineated in the claims. Parts where used in the examples are parts by weight unless otherwise specified.

EXAMPLE 1

In a 2-liter 3-necked flask equipped with an addition funnel, a stirrer, a condenser and a thermometer, 392.68 grams of gamma-mercaptopropyltrimethoxysilane and 4 ml. of a solution of 40 weight percent benzyltrimethylammonium hydroxide in methanol was placed in the flask. Through the addition funnel, a mixture of 145.7 grams of acrylamide and 538.4 grams of methanol was slowly added to the contents of the flask. An exotherm was observed during the addition. The resulting solution was stirred overnight at room temperature. The methanol was stripped from the solution under vacuum. A 95 percent yield of an amide silane of the formula

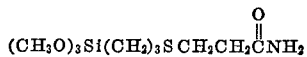

was obtained and had a refractive index of 1.4797.

EXAMPLE 2

A composition was prepared by milling 100 parts of a hydroxyl endblocked polydimethylsiloxane having a viscosity of 12,500 cs. at 25° C. and 30 parts of a fume silica filler having its surface treated to provide trimethylsiloxy units thereon. To the above mixture, 5.5 parts of the amide silane of Example 1 and 0.6 part of dibutyltin diacetate was mixed in manually. An open face molding was made and the cured elastomer had a durometer on the Shore A scale of 25, a tensile strength at break of 608 p.s.i., an elongation at break of 540 percent, a tear strength, Die B, of 142 p.p.i. and a modulus at 150 percent elongation of 111 p.s.i. This elastomer is paintable with both a latex base paint and an oil base paint.

EXAMPLE 3

A composition was prepared by manually mixing into 130 parts of the milled mixture described in Example 2, 4.0 parts of n-propylorthosilicate, 1.0 part of the amide silane of Example 1 and 0.25 part of dibutyltin diacetate. The composition was press molded and allowed to cure at room temperature. The cured elastomer had a durometer on the Shore A scale of 41, a tensile strength at break of 900 p.s.i., an elongation at break of 540 percent, a tear strength, Die B, of 168 p.p.i. and a modulus at 150 percent elongation of 202 p.s.i.

The above composition was also cured at room temperature on peel panels which had one-fourth inch wide and one-sixteenth inch thick of cured elastomer thereon. Aluminum and steel strips were used as substrates.

The peel strength with the aluminum substrate was 8 p.l.i. Another aluminum peel panel was placed in boiling water for 3 hours, allowed to dry and then the peel strength was measured. The aluminum strip broke at 106 p.l.i. without failure of the elastomer bond. Another peel panel was placed in an oven at 250° C. for 24 hours. The elastomer discolored but the peel strength was 1.8 p.l.i. A control composition prepared as described above without the amide silane had a peel strength on an aluminum substrate of 3 p.l.i. after curing and was crumbly after heating for 24 hours at 250° C.

The above peel test where the substrate was steel had a peel strength of 40 p.l.i. after curing, 9.2 p.l.i. after 3 hours in boiling water (the steel surface was rusted) and 18 p.l.i. after heating in an oven at 250° C. for 24 hours. A control composition prepared as described above without the amide silane had a peel strength on a steel substrate of 5 p.l.i. after curing and was crumbly after heating for 24 hours at 250° C.

Cured elastomer strips were painted one with latex base paint and one with oil base paint. After the paint dried, the Boeing 3M-250 tape test was performed by cutting the surface in a cross hatch manner to form small squares, a tape was firmly pressed over this surface and then pulled off. The amount of paint retention was determined by counting the remaining paint squares adhering to the elastomer and the percentage determined. With the latex base paint, there was 80 percent retention and with the oil base paint, there was 100 percent retention. A control composition was also painted as described above and had zero percent paint retention for the latex base paint and from 0 to 57 percent paint retention for the oil base paint.

That which is claimed is:

1. A method for making a room temperature vulcanizable silicone elastomer composition consisting essentially of mixing
   (A) 100 parts by weight of a hydroxyl endblocked polydimethylsiloxane having a viscosity of from 1000 to 100,000 cs. at 25° C.,
   (B) from 5 to 200 parts by weight of a filler,
   (C) from 0 to 14.5 parts by weight of an alkoxy silicon compound selected from the group consisting of ethylorthosilicate, n-propylorthosilicate, ethylpolysilicate and n-propylpolysilicate,
   (D) from 0.5 to 10 parts by weight of a silane of the formula

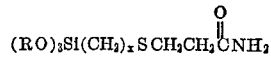

wherein R is methyl, ethyl or propyl and $x$ is 1, 2, 3 or 4, the combination of (C) and (D) providing from 1 to 15 parts by weight per 100 parts by weight of (A),
   (E) from 0.1 to 5 parts by weight of a metal salt of a carboxylic acid wherein said metal ranges from lead to manganese inclusive in the electromotive series of metals and said carboxylic acid has less than 16 carbon atoms.

2. The method in accordance with claim 1 in which R is methyl, $x$ is 3 and the metal salt in (E) is a tin salt.

3. The method in accordance with claim 2 in which the tin salt is dibutyltin diacetate and the alkoxy silicon compound of (C) is n-propylorthosilicate.

4. The method in accordance with claim 1 in which (C) is present in an amount of from 2 to 5 parts by weight and (D) is present in an amount of from 0.5 to 4 parts by weight.

5. The method in accordance with claim 4 in which the filler is a reinforcing silica filler and is present in an amount of from 10 to 60 parts by weight.

6. The method in accordance with claim 5 in which R is methyl, $x$ is 3 and the metal salt in (E) is a tin salt.

7. The method in accordance with claim 6 in which the tin salt is dibutyltin diacetate and the alkoxy silicon compound of (C) is n-propylorthosilicate.

8. The method in accordance with claim 1 in which the amount of (C) present is 0 parts by weight and (D) is present in an amount of from 3 to 10 parts by weight.

9. The method in accordance with claim 8 in which the filler is a reinforcing silica filler and is present in an amount of from 10 to 60 parts by weight.

10. The method in accordance with claim 9 in which R is methyl, $x$ is 3 and the metal salt in (E) is a tin salt.

11. The method in accordance with claim 10 in which the tin salt in dibutyltin diacetate and the alkoxy silicon compound of (C) is n-propylorthosilicate.

12. The product obtained after the composition of claim 1 has cured.

13. The product obtained after the composition of claim 4 has cured.

14. The product obtained after the composition of claim 8 has cured.

References Cited

UNITED STATES PATENTS

| | | | |
|---|---|---|---|
| 3,686,357 | 8/1972 | Cheeseman | 260—375 B X |
| 3,314,982 | 4/1967 | Koerner et al. | 260—448.2 N |

FOREIGN PATENTS

| | | | |
|---|---|---|---|
| 1,018,311 | 1/1966 | Great Britain | 260—448.2 N |

ALLAN LIEBERMAN, Primary Examiner

S. M. PERSON, Assistant Examiner

U.S. Cl. X.R.

260—448.8 R